United States Patent
Kamiya et al.

(10) Patent No.: US 6,637,318 B2
(45) Date of Patent: Oct. 28, 2003

(54) STERILIZING METHOD BY SUBSTITUTING THE DISSOLVED OXYGEN IN MILK OR THE LIKE WITH NITROGEN GAS, A PRODUCT THEREOF AND AN APPARATUS FOR NITROGEN GAS SUBSTITUTION

(75) Inventors: Tetsu Kamiya, Isesaki (JP); Ikuru Toyoda, Higashimurayama (JP); Hiroki Inagaki, Higashimurayama (JP); Yukinari Takeuchi, Higashimurayama (JP); Shunichi Kudo, Iruma (JP)

(73) Assignee: Meiji Milk Products Company, Limited, Tokyo (JP)

( * ) Notice: Subject to any disclaimer, the term of this patent is extended or adjusted under 35 U.S.C. 154(b) by 0 days.

(21) Appl. No.: 10/216,922

(22) Filed: Aug. 13, 2002

(65) Prior Publication Data

US 2003/0015101 A1 Jan. 23, 2003

Related U.S. Application Data

(62) Division of application No. 09/657,504, filed on Sep. 8, 2000, now Pat. No. 6,447,828.

(30) Foreign Application Priority Data

Sep. 9, 1999 (JP) ............................................ 11-256300

(51) Int. Cl.[7] .............................. A23L 1/00; A23L 2/42; A23L 2/46; A23C 3/00; A23C 3/02
(52) U.S. Cl. ............................... 99/453; 99/452; 99/534
(58) Field of Search ........................ 99/452–455, 483, 99/451, 516, 534–536; 426/474, 599, 580, 521; 422/20, 21, 26, 186, 307, 308, 305, 303, 304, 128, 306, 186.3; 366/336–340

(56) References Cited

U.S. PATENT DOCUMENTS

| | | | | |
|---|---|---|---|---|
| 3,113,871 A | * | 12/1963 | Webster | ...................... 426/475 |
| 4,935,255 A | * | 6/1990 | Anderson et al. | ............ 426/316 |
| 5,531,157 A | * | 7/1996 | Probst | ....................... 99/452 X |
| 5,585,128 A | * | 12/1996 | Benedict et al. | .......... 426/330.5 |
| 5,697,291 A | * | 12/1997 | Burgener et al. | .......... 99/452 X |
| 6,120,822 A | * | 9/2000 | Denvir et al. | .............. 422/28 X |

FOREIGN PATENT DOCUMENTS

| | | | |
|---|---|---|---|
| DE | 197 36 643 | * | 2/1999 |
| JP | 8155284 | * | 6/1996 |
| JP | 10 295341 | * | 11/1998 |

* cited by examiner

Primary Examiner—Timothy F. Simone
(74) Attorney, Agent, or Firm—Birch, Stewart, Kolasch & Birch, LLP

(57) ABSTRACT

An object of the present invention is to reduce the generation of smell by sterilization and to improve the taste in carrying out the sterilization of milk or the like, and the method of the present invention is a method where sterilization is carried out after the dissolved oxygen in milk or the like is substituted with nitrogen gas, and the method is characterized in that a means in which nitrogen gas is directly mixed with and dispersed in milk or the like and a means in which milk or the like with which nitrogen gas is not mixed is sprayed from a nozzle(s) to the top of milk or the like, with and in which nitrogen gas has been mixed and dispersed, stored in a nitrogen gas substituting tank under a nitrogen gas atmosphere, are jointly used whereby the dissolved oxygen amount in the milk or the like is reduced by means of substitution of the dissolved oxygen with nitrogen gas, followed by subjecting to sterilization.

3 Claims, 4 Drawing Sheets

STERILIZING METHOD BY SUBSTITUTING THE DISSOLVED OXYGEN IN MILK OR THE LIKE WITH NITROGEN GAS, A PRODUCT THEREOF AND AN APPARATUS FOR NITROGEN GAS SUBSTITUTION

This application is a divisional of Application No. 09/657,504, filed Sep. 8, 2000, now U.S. Pat. No. 6,447,828 entire contents of which are hereby incorporated by reference and for which priority is claimed under 35 U.S.C. §120; and this application claims priority of Application No. 11-256300 filed in Japan on Sep. 9, 1999 under U.S.C. §119.

FIELD OF THE INVENTION

The present invention relates to a method for the sterilization by substituting the dissolved oxygen in milk or the like (defined hereinafter) with nitrogen gas in a sterilization of milk or the like, to a product prepared thereby and to an apparatus for substituting with nitrogen gas.

PRIOR ART

With regard to a method for removing the dissolved oxygen in liquid, a physical method such as an injection method and a tower flushing method and a chemical method using a deoxidizer have been known.

In substituting the dissolved oxygen in liquid with gas, a method where the gas which is used for the substitution is directly injected into a tank of the liquid using a pipe or the like followed by mixing to substitute with the gas has been known.

A gas mixing apparatus in which nitrogen gas and milk or the like are placed in a mixer and stirred whereby oxygen gas is substituted therewith has been known (Japanese Patent No. 2,805,593).

A method in which the oxygen in milk, unheated solution containing milk, fruit juice, etc. is substituted with gas and the dissolved oxygen amount in the liquid is reduced to carry out the sterilization has been known as well (Japanese Patent Laid-Open Publication No. Hei-10(1998)/295341, i.e., JP-A 10-295341).

MATTERS TO BE SOLVED BY THE INVENTION

In the present invention, the matters to be solved are that, when a sterilization is carried out at high temperature (such as at 130° C. for 2 seconds) for making the long preservation of milk or the like possible, sulfides which are the causing substances or the so-called heated smell are generated whereby taste and smell of the beverage is deteriorated.

Most of the said sulfides are dimethyl sulfide and dimethyl disulfide and, since they greatly deteriorate the taste and the smell of the heat-sterilized product, it has been demanded to suppress the generation of the sulfides in carrying out the sterilization.

As such, in order to manufacture a product which can be preserved for long period, the sterilizing condition has been necessary to be at 130° C. for 2 seconds and there is a problem that, when sterilization is carried out under such a condition, generation of the sulfides is inherently unavoidable.

Under such circumstances, there has been a demand that, even when sterilization is carried out under such a high temperature condition necessary for preservation for a long period, production of sulfides is suppressed to such a low extent that the taste and the smell are not deteriorated.

With regard to a means for solving that, a sterilization under the reduction of the dissolved oxygen in the liquid which is to be sterilized is effective and, as one of the methods for reducing the dissolved oxygen in the liquid, substitution of the dissolved oxygen in liquid with an inert nitrogen gas has been carried out.

As to a method for substituting with nitrogen gas as such, physical and chemical methods have been proposed already but, in the sterilization of milk or the like, all of those methods have a low substituting efficiency and, especially in the case of a mechanical mixing and dispersing of the gas, a great volume of foam is generated whereby there is a problem that, in order to improve the efficiency, the equipment becomes large in size and the cost becomes high.

An object of the present invention is to provide a practical method and apparatus of a low cost and without a large device whereby the above-mentioned problem is solved.

Figure 1:
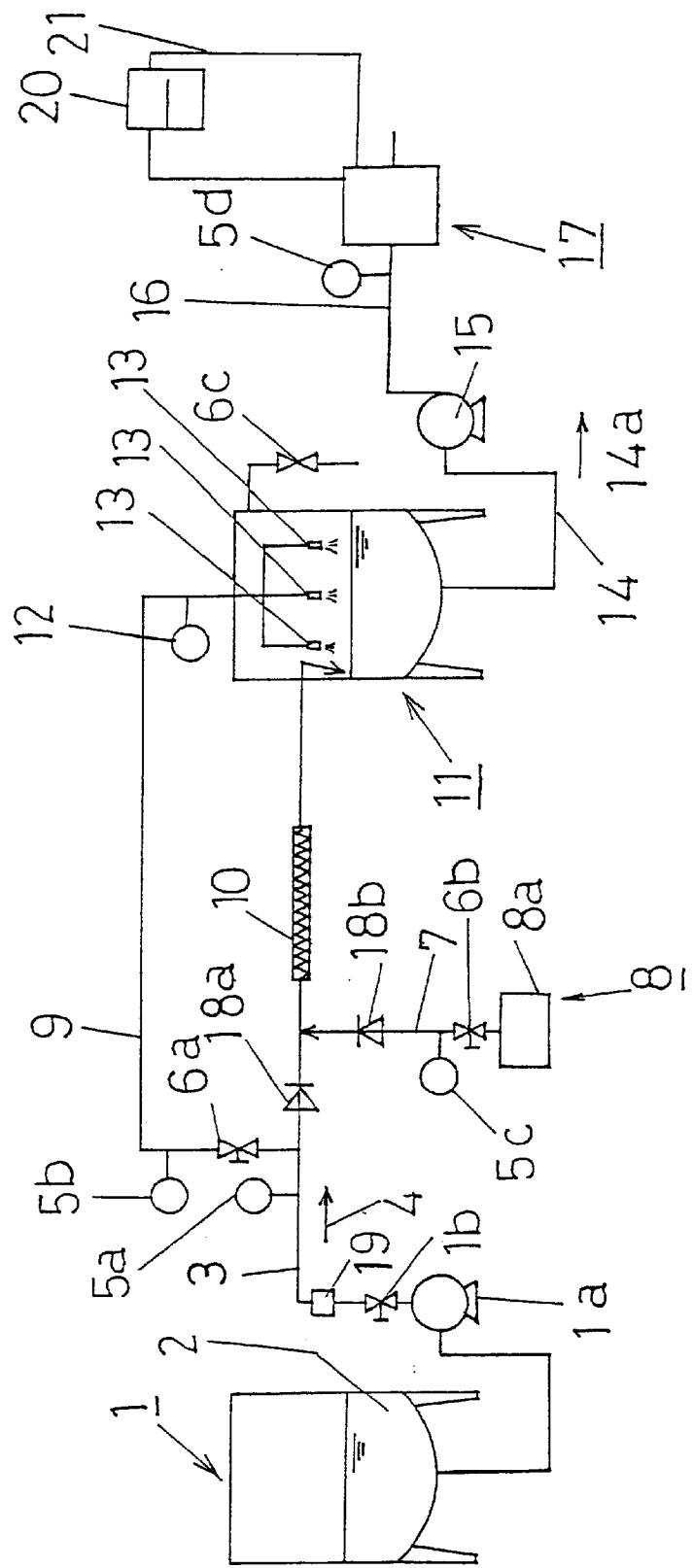
FIG. 1 is a flow sheet of an example of the present invention.

The symbols used therein have the following meanings.

| | |
|---|---|
| 1: | Material tank |
| 1a: | Liquid-sending pump |
| 2: | Material |
| 3, 9, 14, 16, 21: | Liquid-sending pipes |
| 5a, 5b, 5c, 5d: | Flowmeters |
| 1b, 6a, 6b: | Flow rate-controlling valves |
| 6c: | Opening/closing valve |
| 7: | Nitrogen gas pipe |
| 8: | Device for supplying the nitrogen gas |
| 8a: | Nitrogen gas tube |
| 10: | Static mixer |
| 11: | Tank for substituting with nitrogen gas |
| 12: | Pressure gauge |
| 13: | Spraying nozzle |
| 15: | Liquid-sending pump equipped with a revolution controller |
| 17: | Plate Sterilizer |
| 18a, 18b: | Check valve |
| 19: | Clarifier |
| 20: | Homogenizer |

MEANS FOR SOLVING THE MATTERS

In order to solve the above-mentioned problems, the inventors of the present invention have carried out a study and have found that, in a method for sterilization where dissolved oxygen in milk or the like is substituted with nitrogen gas, when (1) a means in which nitrogen gas is directly mixed with and dispersed in milk or the like and (2) a means in which milk or the like of the same material with which nitrogen gas is not mixed is sprayed from a nozzle(s) to the top of milk or the like with and in which nitrogen gas has been mixed and dispersed by the means in the above (1), stored in a nitrogen gas substituting tank under a nitrogen gas atmosphere so that substitution with nitrogen gas and defoaming are effected, are jointly used whereby the dissolved oxygen amount in the milk or the like is reduced by means of substitution of the dissolved oxygen with nitrogen gas and then the resultant milk or the like is subjected to sterilization, generation of sulfides can be suppressed to a low degree and the above problems can be solved.

In accordance with the present invention, the above-mentioned problems can be solved at a low cost and without a large equipment which have not been achieved in the prior art.

In the present invention, when milk or the like, which is a highly foaming liquid, is sterilized after substituting the dissolved oxygen with nitrogen gas, the protein and the saccharide contained in the liquid contribute to generation of foams and, therefore, it is an important matter to treat with suppressing the foaming. Thus, since milk or the like produces excessive foams during its treatment, there are several problems that foamed liquid overflows from a storing tank, that fouling in a sterilizer is enhanced by an entrainment of many fine foams and accordingly that sterilizing function and efficiency are reduced, pressure in a homogenizer during the homogenizing step unstably varies and non-uniformity of filled amount during the filling is resulted. In order to solve such problems, there is a necessity of preparing a large tank or another tank for allowing the milk or the like to be held and, because of preparation of new tanks and setting of time for allowing said holding for defoaming, elongation of the treating time and increase in the treating cost are resulted.

Thus, in order to avoid such problems, it is necessary that, during the treating process, generation of foams is suppressed as much as possible so that substitution of the dissolved oxygen in the liquid with nitrogen gas can be efficiently carried out.

The method according to the present invention relates to a method where sterilization is carried out after the dissolved oxygen in milk or the like is substituted with nitrogen gas. Practically, the method is characterized in that a means in which nitrogen gas is directly mixed with and dispersed in milk or the like and a means in which milk or the like with which nitrogen gas is not mixed is sprayed from at least one nozzle to the top of milk or the like, with and in which nitrogen gas has been mixed and dispersed by the former means, stored in a nitrogen gas substituting tank under a nitrogen gas atmosphere, are jointly used whereby the dissolved oxygen amount in the milk or the like is reduced by means of substitution of the dissolved oxygen with nitrogen gas, followed by subjecting to sterilization. The method according to the present invention is also the method for sterilization where dissolved oxygen in milk or the like is substituted with nitrogen gas according to the above, wherein sterilization is carried out after reducing the dissolved oxygen amount in milk or the like to 2 ppm or less by said substitution. The method of the present invention also relates to sterilization where dissolved oxygen in milk or the like is substituted with nitrogen gas according to the above, wherein the means for mixing and dispersing of the nitrogen is a static mixer. It also relates to a product of milk or the like which is manufactured by a sterilizing method mentioned in any of the above methods. Further, the present invention relates to that, in an apparatus for substituting the dissolved oxygen in milk or the like with nitrogen gas, a substituting apparatus for milk or the like with nitrogen gas which is characterized in that a nitrogen gas substituting tank connected to a material tank by a liquid-sending pipe is installed, a nitrogen gas supplying device is connected to the said liquid-sending pipe at the side of the material tank while a nitrogen gas mixing/dispersing device is installed at the side of the above nitrogen gas substituting tank, another end of the branched liquid-sending pipe connected to the upstream side from the nitrogen gas-supplying device of the liquid-sending pipe is introduced into a nitrogen gas-substituting tank, a spraying nozzle(s) is (are) connected to the said part and, each of the above liquid-sending pipes, the nitrogen gas supplying device and the connecting branched pipe are equipped with a flow rate controlling device. Furthermore, the present invention relates to the substituting apparatus for milk or the like with nitrogen gas according to the above, wherein the mixing/dispersing device for the nitrogen gas is a static mixer and, still further, the present invention relates to the substituting apparatus for milk or the like with nitrogen gas according to the above, wherein the flow rate controlling device is a flow rate controlling valve.

Relation between the dissolved oxygen amount in milk or the like and the taste after sterilization was mentioned in detail in the Japanese Patent Laid-Open Publication No. Hei-10(1998)/295341 which was filed by the present inventors and it was reported that certain difference was noted when the dissolved oxygen amount was 5 ppm while, when it was 1 ppm, a significant difference was noted. Further study has been carried out intensively for the dissolved oxygen amount showing a significant difference as compared with the common heating by referring to the above results and it has been also found that, when it is 2 ppm or less, the effect of substitution with nitrogen gas has been clearly achieved.

BEST MODE FOR CARRYING OUT THE INVENTION

The present invention relates to a method for the sterilization in such a state that the dissolved oxygen in milk or the like is substituted with nitrogen gas to make the dissolved oxygen amount low and also relates to an apparatus for carrying out the nitrogen gas substitution therefor efficiently and to a beverage such as milk which is manufactured by the sterilizing method of the present invention.

It goes without saying that the method for the sterilization in such a state that the dissolved oxygen in milk or the like is substituted with nitrogen gas to make the dissolved oxygen amount low in accordance with the present invention is applicable to other beverages which contain protein and saccharide and have a property of an excessive foaming due to mixing and dispersing with the gas in a substituting process with nitrogen gas, such as processed milk, milk beverage, reconstituted milk, fermented milk, beverage containing lactic acid bacteria, fresh cream and fruit juice beverage. In the present invention, a means where the nitrogen gas is directly mixed with and dispersed in milk or the like and another means where it is sprayed into a tank in a nitrogen atmosphere to substitute with nitrogen gas are jointly used whereby advantageous effect in each of those means results in synergism to give a desired effect. In addition, since in the method of the present invention, nitrogen gas substituting and a rapid defoaming of the foams containing nitrogen gas, etc. are carried out by spraying the same material containing no nitrogen gas, there is no disadvantage of being diluted with different material(s) or being necessary to use a device for removing the different material(s) whereby the process is simplified and efficient.

In the case of milk, the dissolved oxygen amount before the substitution with the gas is about 10 ppm and, in order to lower the dissolved oxygen amount to an extent of 2 ppm by means of substituting with nitrogen gas, the amount of nitrogen gas to be required is approximately 40–50% of the amount of milk to be treated in terms of volume in the method of the present invention.

Now, in order to check the difference in the method of the present invention where a means in which nitrogen gas is directly mixed with and dispersed in milk or the like and a means in which dissolved oxygen in milk or the like is substituted by spraying in a nitrogen gas substituting tank under a nitrogen gas atmosphere are jointly used and in the case where each of the means constituting the present invention is carried out solely, the effect of the latter is shown as Comparative Test Examples 1 and 2.

COMPARATIVE TEST EXAMPLE 1

Nitrogen gas was mechanically mixed with and dispersed in milk (raw milk) containing about 10 ppm of dissolved oxygen using a cascade pump and foams of the nitrogen gas were made fine whereby the dissolved oxygen in the milk was substituted with nitrogen gas. To 150 liters/hour of the flow rate of the milk, nitrogen gas of 30% (45 liters/hour) by volume was mixed and dispersed and the dissolved oxygen amount of the milk was reduced to 2 ppm or less. However, according to this method, foaming of the milk substituted with nitrogen gas was too much and, when the milk after the nitrogen gas substituting treatment was placed in a 500-ml beaker, about one-third thereof was foams. When this nitrogen gas-substituted milk was directly sent to the next homogenizing and sterilizing steps, there were various problems such as variation in homogenizing pressure, increase in fouling of sterilizer, occurrence of natural foaming in the storing tank and elongation of hold time. Accordingly, this method may be evaluated to be that which is unable to be practically used.

COMPARATIVE TEST EXAMPLE 2

Reconstitued skim milk containing about 10 ppm of dissolved oxygen was subjected to a nitrogen gas substitution by a method of spraying of all of the said reconstituted skim milk (concentration of the milk solid was about 8%) at a flow rate of 900 liters/hour from a spraying nozzle into a nitrogen gas substituting tank in a nitrogen gas atmosphere having a 690 mm diameter×900 mm height (volume was about 340 liters). In that case, nitrogen gas was introduced so as to keep the gas phase oxygen concentration about 1.0% by volume in the nitrogen gas substituting tank whereupon the dissolved oxygen concentration became 2 ppm or less. Although the resulting reconstituted skim milk after being substituted with nitrogen gas was foamed, generated amount of the foams was little as compared with Comparative Test Example 1 where nitrogen gas is directly mixed with and dispersed in milk and, when the gas-substituted reconstituted skim milk is held, it was possible to separate the fine foams to such an extent that the next sterilizing step was not affected. In this method however, the gas substituting efficiency is low due to a spraying using a spraying nozzle and the amount which is sprayed within a short period is small. Therefore, when it is practically used, it is necessary to set up many nozzles and to make the size of the nitrogen gas substituting tank large whereby the equipment cost becomes high. Accordingly, this method may be evaluated to be that which is unable to be practically used.

EXAMPLE 1

Now, the present invention will be illustrated by referring to the flow sheet of FIG. 1.

Milk containing about 10 ppm of dissolved oxygen was sent from a material tank (1) via a liquid-sending pipe (3) while nitrogen gas was injected in the milk in the liquid-sending pipe (3) via a nitrogen gas pipe (7) located before a static mixer (10). After that, the nitrogen gas injected in the milk was mixed and dispersed uniformly using the static mixer (10) attached to the liquid-sending pipe (3) so that the dissolved oxygen in the milk was substituted with the nitrogen gas and then the mixture was transferred to a nitrogen gas substituting tank (11) using a liquid-sending pipe (3).

The milk in which the nitrogen gas was mixed and dispersed was supplied to a nitrogen gas substituting tank (11) of 690 mm diameter×900 mm height under the condition of flow rate of 1,000 liters/hour and nitrogen gas amount of 8.2 liters/minute (49% by volume) and flowed down from the liquid-sending pipe (3) in a form of thin film.

In order to maintain the nitrogen atmosphere in the nitrogen gas substituting tank (11), it is necessary that, immediately after the initiation of the operation, nitrogen gas is continuously supplied into a nitrogen gas substituting tank (11). However, in the meanwhile, a direct injection into the milk takes place from the nitrogen gas pipe (7) and the nitrogen gas used for the nitrogen gas substitution for the dissolved oxygen in milk was released into the nitrogen gas substituting tank (11) due to the breakage of the foams and the inner area of the tank was made in a nitrogen gas atmosphere. Accordingly, even when the supply of the nitrogen gas into the tank was ceased, concentration of oxygen of a gaseous phase was kept at about 2.0% by volume during the operation of the apparatus.

On the other hand, the milk which was not mixed and dispersed with nitrogen gas was sprayed into a nitrogen gas substituting tank (11) in a nitrogen atmosphere using spraying nozzles (13) so that the nitrogen gas substitution of the sprayed drops was carried out and, at the same time, foams which were generated therein were extinguished.

Incidentally, a device of mixing and dispersing the nitrogen gas using a static mixer (10) and a device of spraying from the spraying nozzles were carried out at the same time in parallel.

With regard to the spraying amount of the milk from the nozzles (13), it was made 330 liters/hour (about one-third of the total flow rate) using four spraying nozzles (13) and the spraying pressure was made 0.3–0.4 bar.

When substitution with nitrogen gas was carried out under the above conditions, the dissolved oxygen concentration in the milk became 1.98 ppm whereby an object of "2 ppm or less" was able to be achieved. In addition, with regard to the foams in the nitrogen gas substituting tank (11), they were broken or their growth was suppressed by the sprayed drops which were sprayed out from the spraying nozzles (13) whereupon the both effects of nitrogen gas substitution and defoaming were resulted. The fine foams in the nitrogen gas substituting tank (11) were held for about 5 minutes in the nitrogen gas substituting tank (11) whereby they were able to be removed to such an extent that they did not badly affect the next steps such as homogenization and sterilization. The milk which was substituted with nitrogen gas was sent in a direction of an arrow (14a) by driving the revolution-controlled liquid sending pump (15) by a liquid sending pipe (14) installed at the bottom of the nitrogen gas substituting tank (11), preheated at 80–90° C. by a plate sterilizer (17), homogenized by a homogenizer (20), then sent to a plate sterilizer (17) again to sterilize at 130° C. for 2 seconds and filled in containers using a filling machine (not shown) to give a product.

EXAMPLE 2

The same nitrogen gas substitution as in Example 1 was carried out to treat milk containing about 10 ppm of the dissolved oxygen except that the flow rate was made 12,000 liters/hour using a 2,000-liter nitrogen gas substituting tank (11).

The result was that, when 40% by volume of nitrogen gas to the milk were injected and the concentration of oxygen of a gaseous phase in the nitrogen gas substituting tank (11) was 4.0% by volume or less, then amount of the dissolved oxygen in the milk became 1.98 ppm which was "2 ppm or less". Further, when about 6% of the prepared material milk which was not subjected to a nitrogen gas substitution was sprayed, growth of the foams in the nitrogen gas substituting tank (11) was able to be suppressed. Furthermore, when the resultant nitrogen gas substituted-milk was held for 3 minutes in the nitrogen gas substituting tank (11), entrainment of fine foams in the outlet of the nitrogen gas substituting tank (11) was able to be prevented.

Figure 2:
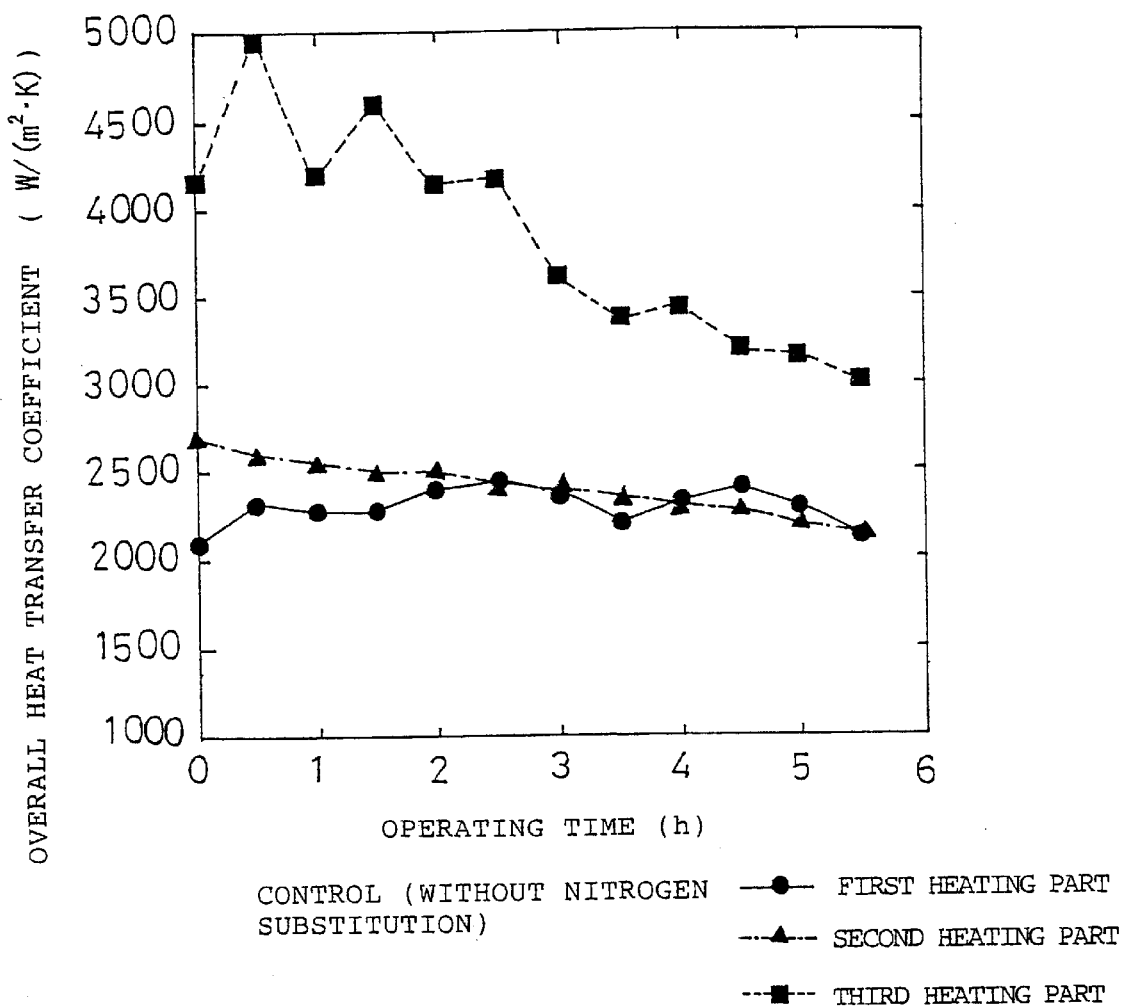
FIG. 2 is a graph showing the changes with a lapse of time of overall heat transfer coefficient of heating part of the sterilizer of the present invention (an example where substitution with nitrogen gas is not carried out).

The milk which received the treatment of nitrogen gas substitution as per the above method was supplied (10,000 liters/hour) to a sterilizer, pre-heated and held at 80–90° C., homogenized and sterilized at 130° C. for 2 seconds. In order to confirm the degree of separation of fine foams from the milk substituted with nitrogen gas, the overall heat transfer coefficients at the three parts of the sterilizer were measured and their changes with a lapse of time were checked. The result is given in FIG. 2 and FIG. 3. FIG. 2 is a control and is an example where no nitrogen gas substitution was carried out.

Figure 3:
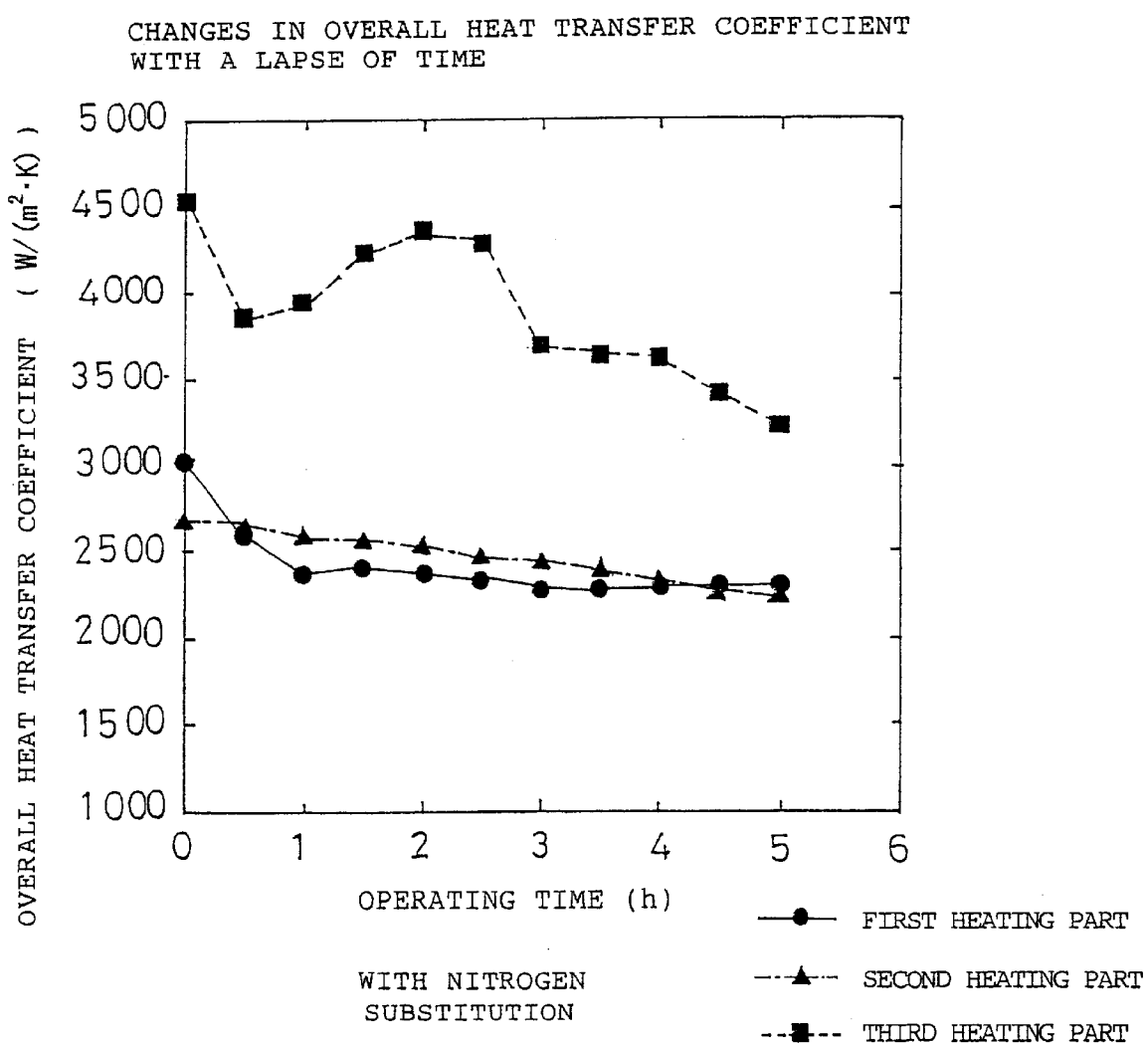
FIG. 3 is a graph showing the changes with a lapse of time of overall heat transfer coefficient of heating part of the sterilizer of the present invention (an example where substitution with nitrogen gas is carried out).

In FIG. 3, an example where a nitrogen gas substitution was carried out is shown.

It is apparent when FIG. 2 and FIG. 3 are compared that, in FIG. 3, the overall heat transfer coefficients at the three heated parts in the during the continuous operation for about 6 hours were nearly same as those in the case of FIG. 2 where no nitrogen gas substitution was carried out and that the tendency of decrease in the heat transfer coefficient with a lapse of time was nearly the same. Accordingly, in the nitrogen gas substitution in the previous step, the fine foams were separated so as not to disturb the operation of the sterilizer.

In addition, there was neither foaming in the preheating and holding tank nor change in the pressure in the homogenizer and it was possible to operate all of the steps in a very stable condition.

After the above-mentioned substitution with nitrogen gas, evaluations of the sterilized milk by an organoleptic test and by a physico-chemical analysis were carried out. Evaluating methods and the results thereof are as follows.

1. Evaluating Method by Organoleptic Test.

A duo-trio test. Any of samples was submitted as a control and then two kinds of samples were submitted whereby the panelist was asked to choose a sample which was believed to be same as the control.

When this test was carried out by 30 panelists and 20 or more answered correctly, it was evaluated that there was a significant difference between the two samples.

A pair test. Sweetness, fragrance, etc. were compared between the samples using a seven-step yardstick from –3 to +3. Incidentally, the result used the data of the only panelists who answered correctly in the duo-trio test.

Results:

A duo-trio test. Correct answer was given by 23 panelists among 30. Therefore, there was a significant difference between the two samples.

A pair-test. The result is shown in the following Table 1. Table 1 is a result of evaluation of an organoleptic test for the milk which was substituted with nitrogen gas.

TABLE 1

(Pair Test)

| | Milk Flavor | Sweetness | Fattiness | Smoothness | Freshness | Throat-through feeling | After-Taste | Overall Evaluation |
|---|---|---|---|---|---|---|---|---|
| Control | 0 | 0 | 0 | 0 | 0 | 0 | 0 | 0 |
| Nitrogen Gas Substituted Milk | 0.22 | –0.74 | –0.98 | 0.15 | 0.18 | 0.45 | 0.98 | 0.18 |

Figure 4:
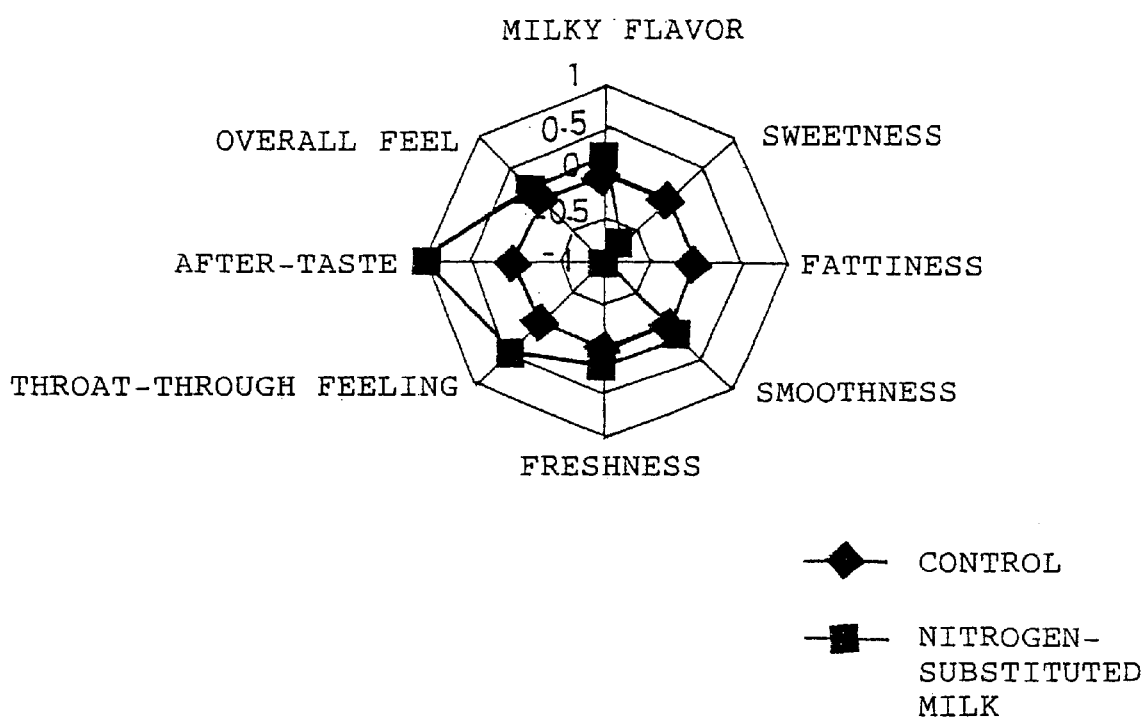
FIG. 4 is a graph of the result of organoleptic evaluations by means of a pair test according to the present invention.

The result of Table 1 shown by a graph is given in FIG. 4.

As a result of a duo-trio test, it was confirmed that there was a significant difference between the nitrogen gas-substituted and sterilized milk and the conventionally sterilized milk (control) and that, as compared with the control, the nitrogen gas-substituted and sterilized products showed particular excellence in terms of after-taste and throat-through feeling and excellence in terms of milky flavor, freshness and smoothness as well. Accordingly, it was clarified by a pair test that the product of the present invention was superior as a whole.

2. Evaluating Method by Physico-Chemical Analysis.

Dimethyl sulfide and dimethyl disulfide which were the representative substances for the resulting heat smell when sterilized at 130° C. for 2 seconds were measured by means of a GC/MS (a head space method) and compared. The result is shown in the following Table 2.

TABLE 2

(Comparative Analysis with Milk Substituted with Nitrogen Gas)

|  | Raw Milk | Sterilization after Substituting with Nitrogen | Conventional Sterilization |
|---|---|---|---|
| Dimethyl Sulfide | $393 \times 10^3$ | $583 \times 10^3$ | $820 \times 10^3$ |
| Dimethyl Disulfide | — | $28 \times 10^3$ | $48 \times 10^3$ |

In the milk which was substituted with nitrogen gas, generation of dimethyl sulfide and dimethyl disulfide was reduced as compared with the conventionally sterilized milk and that supports the result of the organoleptic test.

As such, in accordance with the method of the present invention, even when milk was sterilized at 130° C. for 2 seconds, the test result for the taste showed that the taste was the same as that when sterilization was done at 10–15° C. lower temperature than the actual sterilizing temperature (thus, production of sulfides was less) whereby the taste was able to be improved. In addition, production of foams and entrainment of fine foams into a sterilizer were prevented whereby a stable sterilizing operation was able to be carried out continuously.

Incidentally, in this example, the milk which was substituted with nitrogen gas was held in a tank for 3 minutes (600 liters) and, since it is possible to separate the fine foams to such an extent that the next step is not badly affected when held for 2 minutes (400 liters) or more, it is believed that, in the manufacture, a tank in smaller size than a 2,000-liter tank is sufficient in the case of treatment at 12,000 liters/hour.

EXAMPLE 3

This is an apparatus for substitution of milk or the like with nitrogen gas in which a nitrogen gas substituting tank (11) connected, through a liquid-sending pipe (3), to a material tank (1) is installed; a nitrogen gas pipe (7), with a nitrogen gas tank (8a) and a flowmeter (5c) is connected with the liquid-sending pipe (3) at the side of the material tank (1) as a device for supplying the nitrogen gas; a nitrogen gas mixing/dispersing device (10) is located at the side of the above nitrogen gas substituting tank; other end of a branched liquid-sending pipe (9), which is connected to the liquid-sending pipe (3) up the point at which the nitrogen gas pipe (7) of the nitrogen gas supplying device (8) is connected to the liquid-sending pipe (3), is introduced into a nitrogen gas substituting tank; spraying nozzles (13) are installed at the said part; and each of the above liquid-sending pipes (3, 9) and the nitrogen gas pipe (7) are equipped with flow rate control valves (1b, 6a, 6b) and check valves (18a, 18b)

Now the operation of this apparatus will be explained as follows.

The material (2) was transferred from a material tank (1) by a liquid-sending pump (1a) passing through a clarifier (19) to a nitrogen gas substituting tank (11) through a liquid-sending pipe (3). The material (2) was sent in a direction as shown by an arrow (4) while the flow rate in the liquid-sending pipe (3) was measured by a flowmeter (5a) and, based upon the result thereof, the flow rate was adjusted to a predetermined one by means of a flow rate control valve (1b). Then nitrogen gas was sent into a liquid-sending pipe (3) by a nitrogen gas supplying device (8) connected to a liquid-sending pipe (3). The amount of nitrogen gas which was sent thereinto was measured by a flowmeter (5c) and, based upon the measured result, the supplying amount of the nitrogen gas was controlled to a predetermined amount by a flow rate control valve (6b). After that, the nitrogen gas sent into the liquid-sending pipe (3) was directly mixed and dispersed with the material (2) by a static mixer (10) which was connected to the liquid-sending pipe (3) and the mixture was immediately sent to a nitrogen gas substituting tank (11) as it was and then stored in a nitrogen gas substituting tank (11).

After that, a material which was not mixed with nitrogen gas was sprayed to the upper part of the material in which nitrogen gas has been mixed and dispersed, gas stored in the nitrogen gas substituting tank (11) in a nitrogen gas atmosphere by spraying nozzles (13) installed at the upper opening of the nitrogen gas substituting tank (10) through a branched liquid-sending pipe (9). Since said material accumulated in tank (11) has been mixed and dispersed with nitrogen gas by a static mixer (10), it was in a foamed state.

The material substituted with nitrogen gas was stored in a nitrogen gas substituting tank (11) and the material surface was in such a state that many small and big foams were floated thereon. The material substituted with nitrogen gas was continuously sent from a liquid-sending pipe (3) whereby foams of nitrogen gas were subjected to a natural breaking and nitrogen gas carried by the foams was released and, therefore, a nitrogen atmosphere was formed.

When spraying was carried out from spraying nozzles (13) onto the foams stored in a nitrogen gas substituting tank (11) in a nitrogen atmosphere, sprayed drops were generated whereby a nitrogen gas substitution took place and the sprayed drops fell and collided with the foams whereupon the simultaneously foamed foams were broken to defoam. Thus, in the sprayed material, nitrogen was not injected thereinto and, therefore, it became sprayed drops and collided with the foams to break the foams whereupon the defoaming function was well achieved. In addition, nitrogen gas foams of the material into which nitrogen gas is excessively injected floated on the liquid surface and, with a lapse of time, the foams broke naturally and nitrogen gas and oxygen or air carried in the foams or in the material were released in a nitrogen gas substituting tank (11), resulting in foaming a condition of nitrogen atmosphere in the nitrogen gas substituting tank. The opening/closing valve (6c) was kept open during the operation of this apparatus while it was closed when the operation was stopped.

As such, the foams generated by a substitution with nitrogen gas did not overflow from the nitrogen gas substituting tank (11) but were quickly defoamed by both means of natural breakage and destruction by collision with sprayed drops whereby, when the material stored at the lower part of the nitrogen gas substituting tank (11) was sent to the next step, that did not badly affect the next step.

Incidentally, degree of foaming and defoaming of the material varied depending upon the nature of the material and, therefore, amount of the material to be sprayed from the spraying nozzles (13) was to be appropriately adjusted so that it did not affect the treatment in the next step.

The nitrogen gas substituting tank (11) was also a function as a holding tank for the material wherein nitrogen gas was mixed and dispersed by the static mixer (10) and, therefore, the size of the tank was to be considered in connection with the degree of capability of the sterilizing treatment in the next step. Thus, the surface of the stored liquid was covered by the foamed foams. Due to destruction by sprayed drops and with a lapse of time, the foams broke naturally and gradually. Accordingly, it was necessary to set and select the holding volume in such a manner that retention time necessary for breakage of the foams was secured until no bad affection to the next sterilizing step was exerted by a progress of destruction of the foams with a lapse of time.

As such, it was necessary to conduct the operation after adjusting the mutual conditions for injection amount of the nitrogen gas, amount of the liquid sent to the liquid-sending pipe, numbers of element of the static mixer (10), size of holes of the spraying nozzles (13), numbers of the spraying nozzles (13), holding capacity of the nitrogen gas substituting tank (11), etc. depending upon the nature of the material (2).

When the foams were broken and disappeared until such an extent that no bad affection will be resulted in the next step, a revolution controlled liquid-sending pump (15) was driven by a liquid-sending pipe (14) installed at the bottom of the nitrogen gas substituting tank (11) and the material substituted with nitrogen gas was sent in the direction of an arrow (14*a*). Its flow rate was measured by a flowmeter (5*d*) and an automatic control was carried out depending upon the measured result in sending the liquid to a plate sterilizer,(17) to preheat. After that, it was homogenized in a homogenizer (20), sent to a plate sterilizer (17) again to sterilize and sent to a filling step (not shown) by a liquid-sending pipe to fill whereupon a product was prepared.

ADVANTAGE OF THE INVENTION

In accordance with the present invention, even when a sterilizing treatment is carried out at the sterilizing temperature of 130° C. for 2 seconds, amount of the sulfides generated thereby is suppressed to the same degree as the sterilization is carried out at 10–15° C. lower than the actual sterilizing temperature. Accordingly, the sterilization which is necessary and sufficient for a long-term storage can be carried out and, in addition, generation of the sulfides can be made small whereby there is an advantage of improving the taste. Moreover, it is possible to produce beverage such as milk at a low cost without apparatus having a large size.

What is claimed is:

1. An apparatus for substituting dissolved oxygen present in a protein- or saccharide-containing liquid with a nitrogen gas, which apparatus comprises:

a material tank;

a nitrogen gas substituting tank having at least one spray nozzle therein;

a liquid feed pipe connecting said material tank to said nitrogen gas substituting tank;

a nitrogen gas mixing means installed in said liquid feed pipe;

nitrogen gas supply means connected by a nitrogen gas pipe to said liquid feed pipe at a position upstream of said nitrogen gas mixing means in said liquid feed pipe;

said liquid feed pipe including a branched portion, said nitrogen gas supply means being connected to said liquid supply pipe at a position between said branched portion and said nitrogen gas mixing means, said branched portion connecting said liquid feed pipe to said at least one spray nozzle;

pump means for pumping protein- and saccharide-containing liquid from said material tank to said liquid feed pipe; and flow rate control means positioned at each of the liquid feed pipe upstream of said branched portion, said branched portion of said liquid feed pipe, and said nitrogen gas supply means.

2. The apparatus according to claim 1, wherein said nitrogen gas mixing means comprises a static mixer.

3. The apparatus of claim 1, wherein the flow rate control means comprises a flow rate control valve.

* * * * *